United States Patent Office 2,868,825
Patented Jan. 13, 1959

2,868,825

BICYCLOHEPTENYLETHYLDIETHOXY SILANE

Donald L. Bailey, Snyder, and William T. Black, Buffalo, N. Y., assignors to Union Carbide Corporation, a corporation of New York No Drawing. Application October 31, 1955
Serial No. 544,036

1 Claim. (Cl. 260—448.8)

This invention relates to a novel polymerizable silane derivative. More particularly, the invention contemplates the provision of a polymerizable silane derivative of mixed aliphatic-aromatic composition, wherein the substituent groups consist of ethyl, ethoxy and the unsaturated bicyclic radical, bicycloheptenyl, in the form, bicycloheptenylethyldiethoxy silane, as represented by the structural formula:

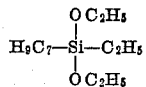

In general, the alkylalkoxysilane derivatives function in much the same manner as the alkylchlorosilanes in that they hydrolyze to form corresponding silicols or their dehydration products. Apart from hydrolysis, the silicic esters may be reacted through their alkoxy groups with the Grignard reagent to attach organic groups directly to the silicon nucleus, and, generally exhibit a great many of the reactive characteristics of the silicic halides. Silane derivatives containing the unsaturated olefinic bond in at least one substituent group also form a distinct and highly useful class of compounds by reason of the fact that they may be crosslinked readily through their reactive organic substituent or substituents in the formation of high molecular weight polymers, or copolymers by reaction with other organic olefinic materials. Furthermore, the reactivity of such a silicon-bonded unsaturated group permits the application of specialized curing techniques, other than conventional condensation procedures, to polymeric molecules containing unsaturated substituents of this type, such, for example, as in the preparation of silicone rubbers. We have found that the bicyclo-olefine substituent group of the compound of the present invention, bicycloheptenyl, not only demonstrates substantially all of the usual olefine reactions but is also slightly more reactive than the conventional open-chain type of unsaturated groups found in similar silane derivatives presently known in industry, presumably because the ring structure facilitates opening of the double bond, and, possibly due in part to the bridged nature of this molecule.

For the most part, the alkyl silicones of relatively high R/Si ratios form oily liquids or weak gels when polymerized, whereas in contrast thereto the aryl silicones of equivalently high R/Si ratios are brittle, fusible solids of little use for most commercial applications. It is now well established that it is possible to enhance the properties of either type of resin by modification with the other, as, for example, by attaching mixed alkyl and aryl substituents to a common silicon atom within the polymeric molecule either by copolymerization of alkyl and aryl silicols, or by modification or substitution within the intermediate compound or compounds employed in the production of such resins. We have found that the bicycloheptenyl-modified alkyldialkoxy silane derivative of the present invention provides an excellent source of mixed alkyl-aryl properties, and, as such, is a useful intermediate in the production of siloxanes in general, and copolymers formed by copolymerization of the compound with organic monomers. Specifically, the compound of the invention is ideally suited for use in the production of silicone elastomers.

We obtain the novel compound bicycloheptenylethyldiethoxy silane by heating vinylethyldiethoxysilane with dicyclopentadiene followed by distillation for recovery of the pure product.

The invention may be best understood by reference to the following specific example of a typical preparation and recovery of our novel compound in accordance with the foregoing procedure:

EXAMPLE

*Preparation of bicycloheptenylethyldiethoxy silane*

Vinylethyldiethoxysilane [ViEtSi(OEt)$_2$], in amount 298 grams and dicyclopentadiene (homocyclic-$C_{10}H_8$), in amount 160 grams were placed in a two-liter flask fitted with a reflux condenser. The mixture was refluxed for four (4) hours during which period the pot temperature rose to 190° C. Thereafter, on distillation, bicycloheptenylethyldiethoxy silane in the form, bicyclo-2·2·1-hept-5-enyl-2-ethyldiethoxysilane, was obtained in a yield of forty-nine percent (49%) and showed the following physical and analytical data:

Boiling point _____ 123.5–124.5°C./18 mm. Hg.
Density ($d_4^{25}$) _____ 0.954 g./cc.
Refractive-index ($n_D$ at
  25° C.) _____ 1.4570.
Bromine absorption (gr.
  Br/100 gr. product:
    Found _____ 67.
    Theor. _____ 67.

|  | Found | Theor. |
|---|---|---|
| Percent Carbon | 65.3 | 64.9 |
| Percent Hydrogen | 9.9 | 10.0 |
| Percent Silicon | 11.4 | 11.7 |
| Percent Ethoxy | 36.6 | 37.5 |

Since it is considered obvious that certain changes and modifications can be made in the foregoing procedures and methods without departing from the nature and spirit of our invention, it is to be understood that the invention is not to be limited to the specific details offered by way of illustration above, except as set forth in the following claim.

We claim:

The chemical compound bicyclo-2·2·1-hept-5-enyl-2-ethyldiethoxysilane.

References Cited in the file of this patent

UNITED STATES PATENTS

| 2,486,162 | Hyde | Oct. 25, 1949 |
| 2,697,089 | Kleiman | Dec. 14, 1954 |
| 2,805,236 | Kiffer et al. | Sept. 3, 1957 |

OTHER REFERENCES

Wagner et al.: "Industrial and Engineering Chemistry." vol. 45, No. 2 (February 1953), (p. 367–374).